UNITED STATES PATENT OFFICE.

D. F. BOYD, OF MANSFIELD, OHIO.

IMPROVEMENT IN DEFECATING CANE-JUICE.

Specification forming part of Letters Patent No. 27,033, dated February 7, 1860.

*To all whom it may concern:*

Be it known that I, D. F. BOYD, of the city of Mansfield, in the county of Richmond and State of Ohio, have invented a new and Improved Method of Defecating Cane-Juice; and I do hereby declare that the following is a full and exact description thereof.

The nature of my invention consists in subjecting cane-juice to a bath in a close vessel, in which vessel, when heat is applied, the steam generated from the juice creates a pressure upon said juice, by which I am enabled to communicate to said juice a high heat, and by the combined agency of high heat and pressure I am enabled thereby to precipitate the entire impurities thereof as a preparatory process to evaporating.

To enable others to use my invention, I will describe the operation.

I take any of the known forms of close vessels in which pressure can be used and to which heat can be applied either by fire or steam. In the cap or upper part of said vessel I insert a Fahrenheit's thermometer with 300° marked thereon, so that the bulb will rest in the juice while the scale will be exposed to view. I also provide a safety-valve, if there is not one already attached. In the lower part of said vessel or heater I insert two stop-cocks, one at the bottom, the other a few inches higher. They are for drawing off the defecated cane-juice and the precipitation separately. This part of the operation being complete, I take cane-juice direct from the crusher, the acids being neutralized, and fill the vessel within a few inches of the top and close said vessel steam-tight. I now apply the heat to the vessel and continue to urge it until the thermometer indicates the desired heat in the juice, which will range from 250° to 300° in different samples. This effected, the heat is immediately removed and the contents left to rest from thirty to sixty minutes. On examination the result will be the precipitation of the entire impurities.

What I claim as my invention, and desire to secure by Letters Patent, is—

The operation herein described, with the result, using the steam which arises from the cane-juice for pressure.

D. F. BOYD.

Attest:
    S. WELCH,
    ALFRED McVEAGH.